United States Patent
Gabryjelski

(10) Patent No.: US 6,639,878 B1
(45) Date of Patent: Oct. 28, 2003

(54) METHOD AND APPARATUS FOR CHARACTERIZING AND IMPROVING OPTICAL DRIVE PERFORMANCE

(75) Inventor: Henry P. Gabryjelski, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/531,236

(22) Filed: Mar. 21, 2000

(51) Int. Cl.⁷ .................................................. G11B 7/00
(52) U.S. Cl. ..................................................... 369/30.25
(58) Field of Search ........................... 369/30.04, 30.25, 369/30.26, 47.15, 47.23, 59.22

(56) References Cited

U.S. PATENT DOCUMENTS 5,561,649 A * 10/1996 Lee et al. ................. 369/47.23
5,870,355 A * 2/1999 Fujihara ................... 369/30.26
6,507,672 B1 * 1/2003 Watkins et al. ............. 382/232
6,519,676 B1 * 2/2003 Suzuki et al. ............. 369/30.25

* cited by examiner

*Primary Examiner*—Thang V. Tran
*Assistant Examiner*—Bach Vuong
(74) *Attorney, Agent, or Firm*—Lee & Hayes PLLC

(57) ABSTRACT

A system and related methods for characterizing and improving optical drive read performance is presented. The system includes an innovative audio file stored on optical media (characterization file), and an optical drive characterization agent, implemented on a computing system. The optical drive characterization agent iteratively controls the optical drive to perform incremental reads of at least a subset of the characterization file, analyzes at least the subset of the characterization file read from the optical media, and generates one or more performance scores on an associated one or more performance attributes of the optical drive. In this regard, optical drive characterization agent quantifiably characterizes an optical drive's ability to accurately read individual sectors from optical media comprising audio content.

27 Claims, 5 Drawing Sheets

Fig. 3

| Sector 302 | Block 304 | R_Ch 306 | L_Ch 308 | Synch Offset 310 | Intra-Sector Misalignment 312 | Inter-Sector Misalignment 314 |
|---|---|---|---|---|---|---|
| 1 | 23 | 32 | 32 | 0 | 0 | 0 |
| 1 | 24 | 33 | 33 | 0 | 0 | 0 |
| 1 | 49 | 60 | 60 | 0 | 0 | 0 |
| 1 | 50 | 64 | 64 | 1 | 4 | 0 |
| 1 | 100 | 100 | 100 | 0 | 0 | 0 |
| 2 | 1 | 102 | 102 | 0 | 0 | 2 |
| 2 | 30 | 121 | 122 | 1 | 0 | 0 |
| 2 | 31 | 122 | 123 | 1 | 0 | 0 |
| 4 | 50 | 453 | 453 | 0 | 0 | 0 |
| 4 | 51 | 454 | 9754 | ! | ! | ! |
| 4 | 52 | 455 | 455 | 0 | 0 | 0 |

METHOD AND APPARATUS FOR CHARACTERIZING AND IMPROVING OPTICAL DRIVE PERFORMANCE

TECHNICAL FIELD

This invention generally relates to reading information from optical drives and, in particular, to a method and apparatus for characterizing and improving optical drive performance.

BACKGROUND OF THE INVENTION

Computing technology continues to evolve at an ever-increasing rate. Once the domain of only high-end computer systems, optical drives such as the compact disk (CD) read-only memory (ROM) drives, digital versatile disk (DVD) drives, and the like are now standard equipment on even the lower-cost, entry-level computers. Indeed, because of their low cost, high storage capacity and access time attributes, some systems are now foregoing inclusion of the once preeminent floppy drives in favor of optical drive technology.

Once these optical drives began appearing in computing systems, having the same generic name (CD player) as their favorite audio component, many computing system users wanted to use these optical drive systems to play their favorite audio (music) discs. What the basic user does not realize, however, is that audio discs and data discs utilize separate and distinct formatting standards that make it very difficult for an optical drive in a computer system to accurately read and render audio data.

The compact disc digital audio standard (CD-DA) (also commonly referred to as the Red Book standard), was defined in early 1980 by Philips, N.V. and Sony Corporation. Under the Red Book standard, audio information is digitized at 44.1 kHz in a range of 65,536 possible values (i.e., 16-bit audio). While the CD-DA disc is organized into frames (24 bytes/frame), the audio data itself is not arranged in any particular units, but rather is interlaced in and among frames to improve tolerance to physical flaws or damage to the media (e.g., a scratch).

The compact disk, read-only memory standard (CD-ROM) (also commonly referred to as the Yellow Book standard), was defined by Philips and Sony in 1983 as an extension to the Red Book standard. The CD-ROM standard differs from the CD-DA standard in a number of respects, perhaps the most notorious of which for purposes of rendering audio data is the manner in which the data is organized on the optical media (disc). Under the CD-ROM standard, data tracks are organized into uniquely identifiable sectors facilitating random access search and retrieval applications. More specifically, data tracks are segmented into 2352 byte sectors, 2048 bytes of which are devoted to data, while 304 bytes are dedicated to header information (e.g., block address information, synchronization information, error correction codes (ECC), and the like). This header information enables the optical drive system to accurately seek out sectors on an individual basis (i.e., by reading the header information). When viewing an audio track under the sectorized CD-ROM paradigm, however, the audio information consumes the entire 2352 bytes of the sector, i.e., an audio disc track does not include this 304-byte header block. Consequently, an accurate seek to a specific location within an audio track is very difficult. Indeed, the Red Book standard considers a deviation of ±75 sectors (or ±7350 frames, or ±176,400 bytes, or ±0.5 seconds), which would be perceptible to the human ear. Indeed, an offset of even 0.25 seconds is perceptible to the human ear. One of the reasons for this seemingly "lax" standard is that it is quite rare for an end user to need to be able to instantly jump to a particular point within an audio track.

The typical errors that arise when trying to make such a precise (or accurate) read of audio tracks with a CD-ROM optical drive include: not reading audio data on sector boundaries (i.e., 2352 byte boundaries) (i.e., inaccurate reads), reading different data for the same request at different times (i.e., reading sector 2 then re-reading sector 2 and getting different audio data), overlapping or skipping a small subset of bytes for reads that should have continuous bytes (contiguous reads), and other accuracy problems. These limitations of the optical drive systems in accurately rendering audio media often resulted in undesirable user-perceptible audio artifacts, e.g., pops, holes, etc.

To overcome these limitations, and to attempt to ensure user-acceptable audio, many optical drive systems utilize a stitching technique when rendering audio content. That is, the optical drive system would perform multiple reads of a sector, or groups of sectors, and load the information into a buffer, analyze the buffered data to identify overlapping data between the read samples, and statistically reconstruct the sectors by fusing the overlapping data. Stitching has a number of drawbacks, however, including the storage capacity required to handle the multiple samples, the number of reads that must be performed to stitch together the resultant audio track, and the overall processing complexity required to analyze the samples and piece together the audio tracks.

The need for accurate reads of digital audio content from optical media has increased, as more applications require accurate digital audio (i.e., MP3 applications, Digital Audio Playback under Windows® 98 and Windows® 2000). Given the prior art techniques employed by the various optical drive manufacturers, there was no way to know a priori what to expect from a READ command, especially since a drive's firmware may have implemented a caching algorithm that would prevent simple re-reads of the same sector as test of accuracy.

Thus, a method and apparatus of quantifiably characterizing and improving optical drive performance for rendering digital audio is required, unencumbered by the inherent limitations commonly associated with the prior art. Just such a solution is provided in the description to follow.

SUMMARY OF THE INVENTION

This invention concerns a method and apparatus for characterizing and improving optical drive performance. In this regard, the present invention is comprised of an innovative audio file stored on optical media (characterization file), and an optical drive characterization agent, implemented on a computing system. According to a first aspect of the present invention, the optical drive characterization agent iteratively controls the optical drive to perform incremental reads of at least a subset of the characterization file, analyzes read subset of the characterization file, and generates one or more performance scores on an associated one or more performance attributes of the optical drive. In this regard, optical drive characterization agent quantifiably characterizes an optical drive's ability to accurately read individual sectors from optical media comprising audio content. Once the drive's performance has been characterized, characterization agent identifies and maintains quantifiable offsets, as appropriate, to improve optical drive read performance.

In accordance with another aspect of the present invention, an optical drive characterization file is presented. The characterization file is comprised of a non-repeating pattern of audio data at least twice the length of a non-obvious offset for contiguous reads. According to one embodiment, the characterization agent has a priori knowledge of the non-repeating pattern of audio data comprising the characterization file. According to an alternate embodiment, the characterization agent does not have a priori knowledge of content of the non-repeating pattern, but rather of a set of rules used to generate the non-repeating pattern comprising the characterization file, and dynamically tests the read data against these set of rules.

BRIEF DESCRIPTION OF THE DRAWINGS

FIG. 3 is a graphical illustration of an example optical drive optimization table, according to one embodiment of the present invention;

DETAILED DESCRIPTION

Example Computer System

In the discussion herein, the invention is introduced in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices. It is to be appreciated, however, that the present invention may alternatively be implemented in hardware such as, for example, a microcontroller, a processor, an application specific integrated circuit (ASIC), a field-programmable gate array (FPGA), a programmable logic device (PLD), and the like.

Figure 1:
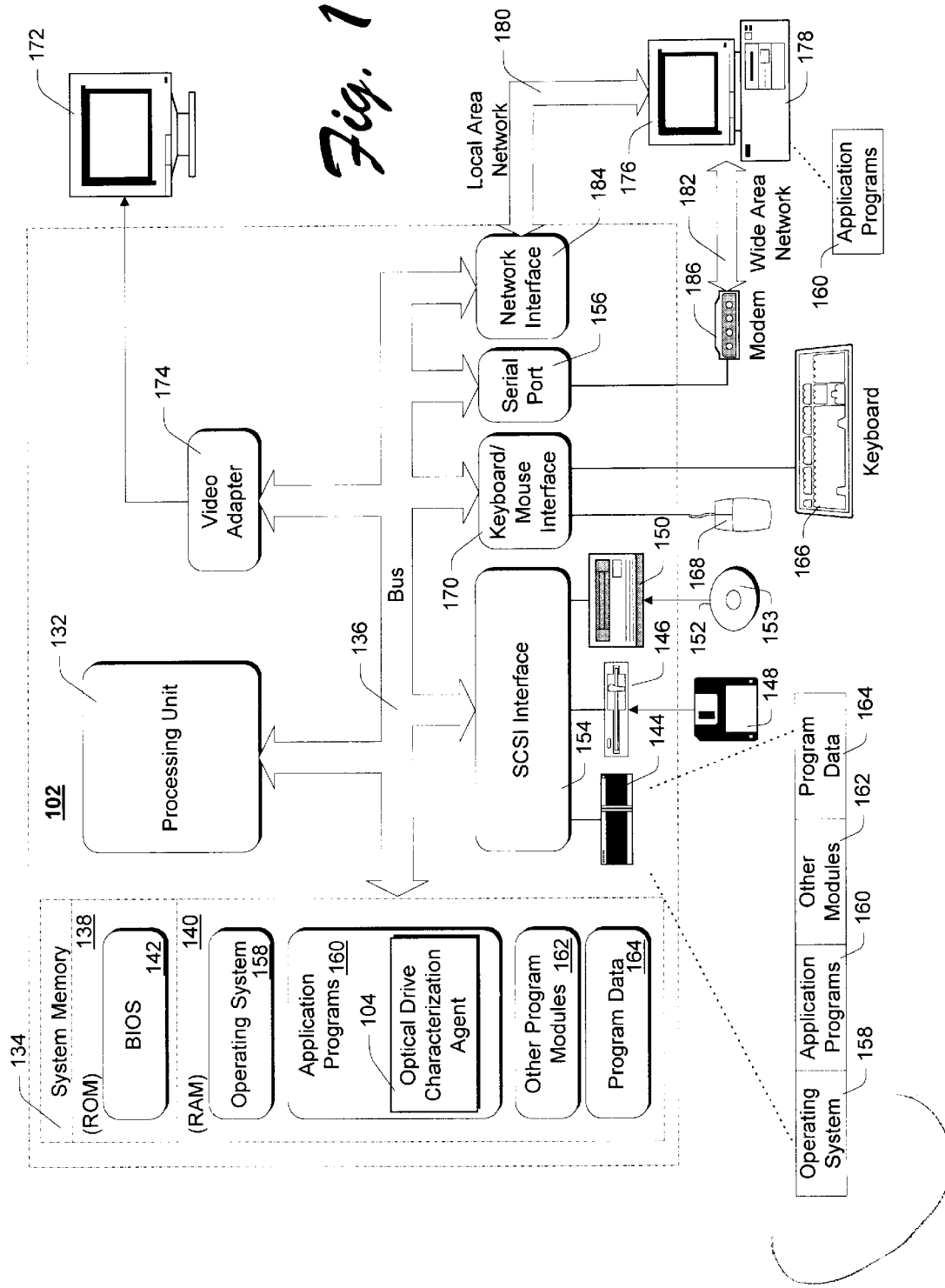
FIG. 1 is a block diagram of an example computer system incorporating the teachings of the present invention.

FIG. 1 shows a general example of a computer system 102 incorporating the teachings of the present invention. It will be evident, from the discussion to follow, that computer 102 is intended to represent any of a class of general or special purpose computing platforms which, when endowed with the innovative characterization agent 104, implement the teachings of the present invention. In this regard, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. According to one aspect of the present invention, to be described more fully below, optical disk 152 includes an audio file 153, which is used by characterization agent 104 to characterize one or more performance attributes of optical drive 150.

The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, optical drive characterization agent 104, other program modules 162, and program data 164. A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 1.

As shown, the logical connections depicted in FIG. 1 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Washington to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is typically connected to the bus 136 via a serial port interface 156. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain subcomponents of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Optical Drive Characterization Agent

Figure 2:
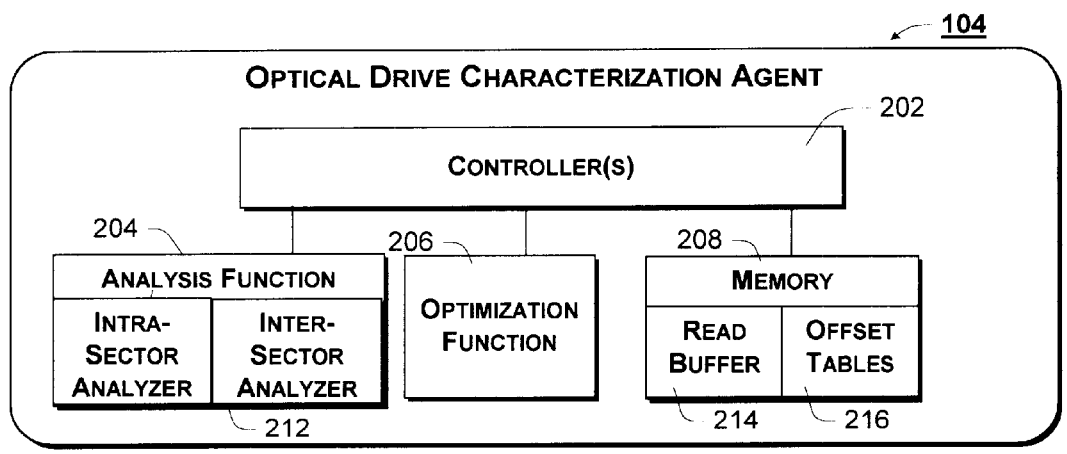
FIG. 2 is a block diagram of an example optical drive characterization agent, according to one aspect of the present invention.

FIG. 2 illustrates a block diagram of an example optical drive characterization agent 104 incorporating the teachings of the present invention. As shown, characterization agent 104 is generally comprised of one or more controller(s) 202, analysis function 204, optimization function 206 and a storage location/memory device 208, each coupled as depicted. According to the illustrated example embodiment, analysis function 204 includes intra-sector analyzer 210 and inter-sector analyzer 212. Memory 208 includes storage space for at least read buffer 214 and one or more offset tables 216. It should be appreciated that although depicted as a number of independent functional elements, one or more elements of characterization agent 104 may well be combined without deviating from the spirit or scope of the present invention. Moreover, one or more elements may be remotely located from, yet operatively coupled to, one or more elements of optical drive characterization agent 104 and still carry out the optical drive characterization and optimization described below. In this regard, characterization agent 104 of FIG. 2 is intended to be merely illustrative of the claimed invention.

Optical drive characterization agent 104 may well be invoked in any of a number of ways. According to one implementation, a higher-level application associated with, for example, the operating system includes a user interface, which enables an end-user to selectively invoke optical drive characterization agent 104. In alternate embodiments, characterization agent 104 is a manufacturing tool, implemented in the back-end of the optical drive manufacturing process. In either case, controller 202 receives an external indication to characterize and/or improve the read performance of communicatively coupled optical drive (e.g., optical drive 150 of FIG. 1). In response, controller(s) 202 selectively invoke one or more of analysis function 204 and optimization function 206 to characterize and optimize read performance attributes of an optical drive. Except as configured to effect the teachings of the present invention, controller 202 is intended to represent any of a number of alternate control systems known in the art including, but not limited to, a microprocessor, a programmable logic array (PLA), a micro-machine, an application specific integrated circuit (ASIC) and the like. In an alternate implementation, controller 202 is intended to represent a series of executable instructions to implement the control logic described above.

As introduced above, controller 202 selectively invokes analysis function 204 to characterize one or more performance attributes of a coupled optical drive by iteratively controlling the drive to read at least two consecutive sectors of an audio file from an optical disc populating the drive. As shown, analysis function 204 includes an intra-sector analyzer 210 and an inter-sector analyzer 212, each of which will be described in turn. As introduced above, each sector of an audio file is comprised of 16-bit audio samples, per channel, per bundle. Thus, in the case of two-channel audio (most common), a bundle is comprised of 32 bits, 16 bits associated with each of the right and left channel of stereo audio. According to one embodiment of the present invention, intra-sector analyzer 210 analyzes at least a subset of contiguous bundles within a sector to measure and quantify channel offsets and bundle misalignment, while inter-sector analyzer 212 analyzes a final bundle from one sector and an initial bundle from a subsequent sector to measure and quantify inter-sector misalignment (i.e., the drive's ability to accurately read on sector boundaries).

In order to quantify these attributes, without a priori knowledge of the drive's ability to make accurate digital reads, a specially produced audio file 153 is utilized. An example of the audio content of audio file 153 is introduced with reference to FIG. 4.

Figure 4:
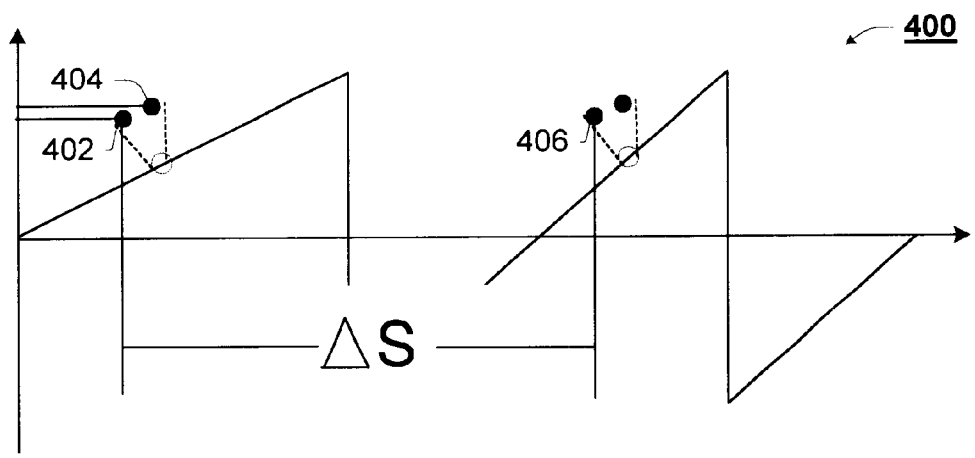
FIG. 4 is a graphical representation of an example non-repeating pattern of audio data, suitable for use in the optical drive characterization file.

Turning briefly to FIG. 4, an example audio waveform 400 suitable for use by characterization agent 104 is graphically illustrated according to one aspect of the present invention. The waveform 400 is comprised of a number of bundles 402, 404, 406, etc., wherein each bundle represents a 16-bit sample for each channel of supported audio (e.g., a left channel and a right channel). As introduced above, the CD-DA (Red Book) standard allows for a read accuracy deviation of ±75 sectors. Accordingly, this deviation implies that an exemplary audio pattern would not repeat any data within this permissible deviation of ±75 sectors. However, as introduced above, any optical drive that misreads by an amount greater than 0.25 seconds can be verified by simply listing to the audio. If an optical drive is having such large read offsets (e.g., greater than 0.25 seconds, or ±37.5 sectors) the probability of seeking the exact amount expected each time is extremely small (e.g., $Mv^{-N}$, where Mv is the minimum length of the non-repeating pattern in the audio track (e.g., 65,536 for a 16-bit implementation, and and N is the number of erroneous seeks). Thus, according to one example implementation of the present invention, waveform 400 is used to identify misreads of 0.25 seconds or less, i.e., ±37.5 sectors. This requirement is mathematically illustrated with reference to equation 1, below.

$$\int \geq Z = (\text{Max Offset} * 2352 \text{ samples/sector})/4 \text{ bytes/samples} \leq Mv \quad (1)$$

$$\int \geq Z = (75 \text{ sectors} \times 2352 \text{ samples/sector})/4 \text{ bytes} \leq Mv$$

where:
- $\int$: is the permissible deviation (±37.5 sectors)
- Z: is the sample, which must be less than the maximum permissible deviation and less than the max number of 16 bit values, i.e., in order to be used as a sample within either channel.
- Mv: is the minimum length of the non-repeating pattern in the audio track (e.g., 65,536 for a 16-bit audio implementation).

A number of alternate waveforms can be identified which satisfy this criteria. In accordance with the illustrated example embodiment of FIG. 4, a saw-tooth waveform is utilized. In accordance with the teachings of the present invention, the period of the waveform is at least twice the length of a non-obvious offset for contiguous reads. As shown, each bundle (left and right channel sample) from waveform 400 is one amplitude unit greater than the bundle immediately preceding it, as illustrated with bundles 402 and 404. Moreover, the pattern is non-repeating over ±32, 766 samples (or, approximately 1.5 seconds of audio data), e.g., from bundle 402 to bundle 406. The saw-tooth waveform 400 of FIG. 4 enables characterization agent 104 to know, given a first bundle, what the amplitude of the second bundle within a sector should be (e.g., 1 unit greater than the previous bundle), any deviations there from provides a quantifiable intra-sector read misalignment value. Moreover, assuming for a moment that bundle 402 is the end of a sector, and bundle 404 is the beginning of a subsequent sector, any deviation from the expected amplitude value of bundle 404 provides an inter-sector misalignment value (i.e., indicative of an optical drive's inability to accurately read on sector boundaries). It should be appreciated, however, that the waveform and/or the algorithm may well be modified to use multi-sample values in the testing, and/or to use a non-linear waveform that bases the next sample on the previous N samples. Such an implementation would have the added benefit of allowing arbitrarily large seek offsets to be found (e.g., greater than 0.25 seconds). Indeed, according to one implementation, an optical medium (e.g., 152) having multiple tracks may be used, each track implementing one of the example waveforms described above, to facilitate more comprehensive characterization and quantization of optical drive performance. Such alternate implementations are anticipated within the scope and spirit of the present invention.

According to one implementation, the size of the waveform 400 stored on optical media 152 is enough to flush a read buffer of the optical drive 150, e.g., at least 2 Mb of data. According to one implementation, a 10–15 Mb waveform is used. Again, it is to be appreciated that any of a number of alternate waveforms that meet the foregoing criteria may well be used without deviating from the spirit and scope of the present invention. Such alternate embodiments are anticipated within the present invention.

Returning to FIG. 2, intra-sector analyzer 210 reviews the amplitude information from successive bundles (e.g., 402 and 404) within a sector to quantify a misalignment attribute of the optical drive. In addition, intra-sector analyzer 210 reviews the amplitude information from each channel of the bundle to measure channel synchronization. Each of these metrics are provided to controller 202 for each bundle read, wherein controller 202 populates an offset table with the raw data and/or any metrics computed from the raw data (see, e.g., FIG. 3).

Inter-sector analyzer 212 reviews the amplitude information from consecutive bundles bridging two successive sectors. Assume, for purposes of illustration, that bundle 402 (FIG. 4) is the last bundle of one sector and bundle 404 is the first bundle of a subsequent sector. By comparing the amplitude information taken from these bundles, inter-sector analyzer quantifiably characterizes the optical drives ability to accurately read on sector boundaries. As above, the raw data and/or computed metrics are provided to controller 202 for storage in offset tables.

In accordance with another aspect of the present invention, optical drive characterization agent 104 includes an optimization function 206. Once an optical drive's performance has been characterized and documented by analysis function 204, controller 202 may selectively invoke optimization function 206 to modify one or more control settings of the optical drive from which the characterization information was obtained, to improve the optical drive's ability to accurately read audio content. In this regard, optimization function 206 identifies whether any appropriate control settings of the optical drive are modifiable and, if so, proceeds to modify appropriate ones of the control settings as dictated by the performance metrics. If it is determined that an optical drive's control settings are not modifiable, optimization function 206 may provide alternate indications to an end-user that the optical drive may not provide an acceptable level of audio quality. As shown, memory 208 includes a read buffer 214 and one or more offset tables 216. The read buffer 214 is used by characterization agent to store bundles of read sectors used by analysis function 204. Offset tables 216 are used by characterization agent to store amplitude data from the read sectors, and any performance metrics generated.

Although described as separate functional elements, it is to be appreciated that one or more of controller 202, analysis function 204, optimization function 206 and memory 208 may well be integrated into a single functional element. Moreover, it is to be appreciated that analysis function 204 and/or optimization function 206 may well be implemented in hardware or a series of executable instructions which, when executed, implement the innovative functions described above.

Example Data Structures

Figure 5:
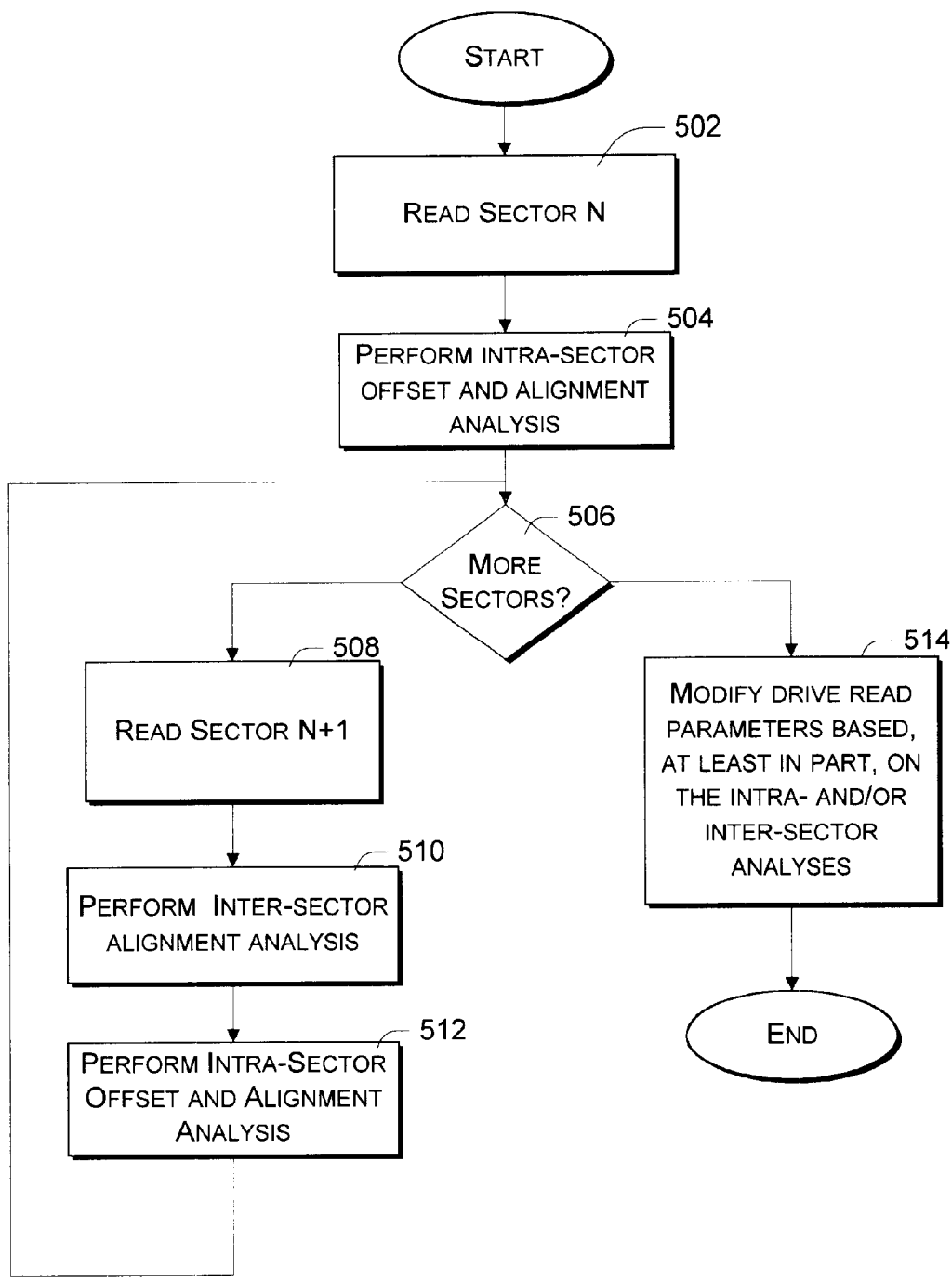
FIG. 5 is a flow chart of an example method for characterizing and improving optical drive read performance, according to one embodiment of the present invention.

FIG. 5 graphically illustrates an example data structure suitable for use with the innovative characterization agent of the present invention. In accordance with the illustrated example embodiment, data structure 208 advantageously combines read buffer 214 and offset tables 216 into a common data structure. It is to be appreciated that data structures of greater or less complexity may well be used without deviating from the spirit and scope of the present invention. For ease of explanation and clarification, five (5) separate read scenarios are illustrated in FIG. 5 to illustrate how characterization agent 104 quantifies optical drive performance.

As shown, data structure 208 includes a sector identification field 302, a block (or bundle) identification field 304, a right channel sample field 306, a left channel sample field 308, a channel synchronization field 310, a intra-sector misalignment field 312 and an inter-sector misalignment field 314. For each bundle within a sector, data structure 208 is populated with identification (302, 304), amplitude (306, 308), channel synchronization metric (310) and intra-sector misalignment metric (312) information. For each bridge between sectors, an additional inter-sector misalignment (314) metric is generated.

As introduced above, five (5) separate read scenarios are illustrated within data structure 208. The first read scenario, enumerated with reference 316, illustrates a read of successive blocks (or bundles) (23–24) wherein the channels are aligned (e.g., no offset), and the successive bundle's amplitude increases incrementally. In this instance, the synch offset field 310, and the misalignment fields 312 and 314 are all zero (0) (note, inter-sector misalignment field will always be zero for such intra-sector bundle analysis).

Case 318 illustrates an instance of intra-sector misalignment. As shown, the amplitude for each channel of the bundle is identical, but it does not incrementally increase (e.g., by one in this example) between immediately adjacent bundles—rather, an amplitude increase of four (4) is illustrated. In this instance, the intra-sector misalignment field 312 reflects this offset of four (4).

Case 320 illustrates an inter-sector misalignment example. As shown, the amplitude for each channel of the bundle is consistent within each bundle, however, it does not incrementally increase between immediately adjacent bundles, wherein the immediately adjacent bundles mark the end of a first sector and the beginning of a second sector. In this instance, the identified offset (2), is reflected in the inter-sector misalignment field 314.

Case 322 illustrates a channel synchronization offset between channels within a bundle. As introduced above, given that a single common waveform of bundles (inclusive of both channels) is used, the synch offset should be zero (0). In the illustrated example case 322, the offset is one (1), offsetting reads by an offset from the start of the sector that is not an integral multiple of the sample size (i.e. 16 bits offset, not 32 bits). This 16-bit offset results in the left and right channels being swapped.

Finally, case 324 illustrates example values denoting a flaw in the optical media where a bundle is located. As shown, the left channel of bundle 51 of sector 4 contains an amplitude which drastically deviates from that which the characterization agent 104 would expect. In this instance, characterization agent 104 populates the offset table 216 with a character denoting detection of a fault. In the illustrated example embodiment, the fault is denoted with an exclamation point (!). It should be appreciated, although not depicted, that multiple failure modes (or offsets) may be detected within and between bundles. Moreover, alternate means of quantifying optical drive read performance may well be used, based on the characteristics of the audio file used to test the drive's performance. In one embodiment, for example, an audio file associated with a song is read from an optical disc and compared to a digital representation of the song communicatively available to characterization agent 104 (e.g., within memory 208, via a network, etc.). Such alternate embodiments are anticipated within the spirit and scope of the present invention.

Example Operation and Implementations

FIG. 5 is a flow chart of an example method for characterizing and potentially improving one or more read performance characteristics of an optical drive, according to the teachings of the present invention. For ease of explanation, and not limitation, the method of FIG. 5 will be developed with continued reference to FIGS. 1–4.

Turning to FIG. 5, the method begins with block 502, wherein controller 202 invokes an instance of analysis function 204. Analysis function 204 controls optical drive 150 to read a sector N of audio content (400) from audio characterization file 153 stored on optical media 152. Once the sector (N) has been read, intra-sector analyzer 210 analyzes the amplitude information within and between successive bundles to quantify channel synchronization and misalignment offsets, block 504. In addition, although not depicted, analysis function 204 may also cause optical drive 150 to perform additional reads of audio characterization file 153 in order to flush the drive's internal read cache (not shown).

In block 506, controller 202 makes a determination of whether additional sector reads are necessary. According to one implementation, for example, controller 202 makes a plurality of successive reads of different sizes, e.g., 2 sectors, 3 sectors, 4 sectors, 5 sectors, etc. The purpose of such iterative analysis is that some optical drives may perform to Red Book specification with a particular read size, while failing at other read sizes. In such an instance, optical characterization agent 104 can accommodate such a limitation in the optical drive's performance by modifying one or more control settings in the optical drive 150, and or within the host computing system 102 (e.g., 158, 160, etc.) to mandate that reads of audio files be performed in accordance with this detected optimal size.

Assuming for purposes of illustration that additional sector reads are required, analysis function 204 controls optical drive 150 to read a subsequent sector from audio file 153, block 508. According to one example implementation, analysis function 204 causes optical drive to read the immediately subsequent sector. In alternate implementations, since the amplitude information for any given sector is known a priori, any subsequent sector may be read and the amplitude information obtained from the sample is compared to the theoretically correct amplitude. In block 510 inter-sector analyzer 212 is invoked to quantify the optical drive's ability to accurately read on sector boundaries. Any deviations from the theoretically correct amplitude is quantified by inter-sector analyzer 212, and provided to controller 202 which stores the inter-sector misalignment offset(s) in the offset tables (400). In addition to the inter-sector analysis (510), intra-sector analyzer 210 may well be invoked to perform additional analysis on the subsequently read sectors, as described above, block 512.

According to select implementations, such as the illustrated example implementation, once the characterization agent 104 has completed the characterization process (502–512), controller 202 invokes the optimization function 206 to modify one or more optical drive control settings to improve one or more optical drive performance settings, block 514. In accordance with one aspect of the present invention, optimization function 206 modifies one or more of an optical drive's read size setting, read offset, alignment and/or synchronization parameters based, at least in part, on the intra- and/or inter-sector analyses results recorded in offset tables 216.

In this regard, optical drive characterization agent 104 introduces a means of quantifiably measuring the read performance of an optical drive (150), and provides a means for modifying one or more of the drives control settings to accommodate one or more identified limitations in the drive's performance, thereby providing for improved reads of audio content.

Figure 6:
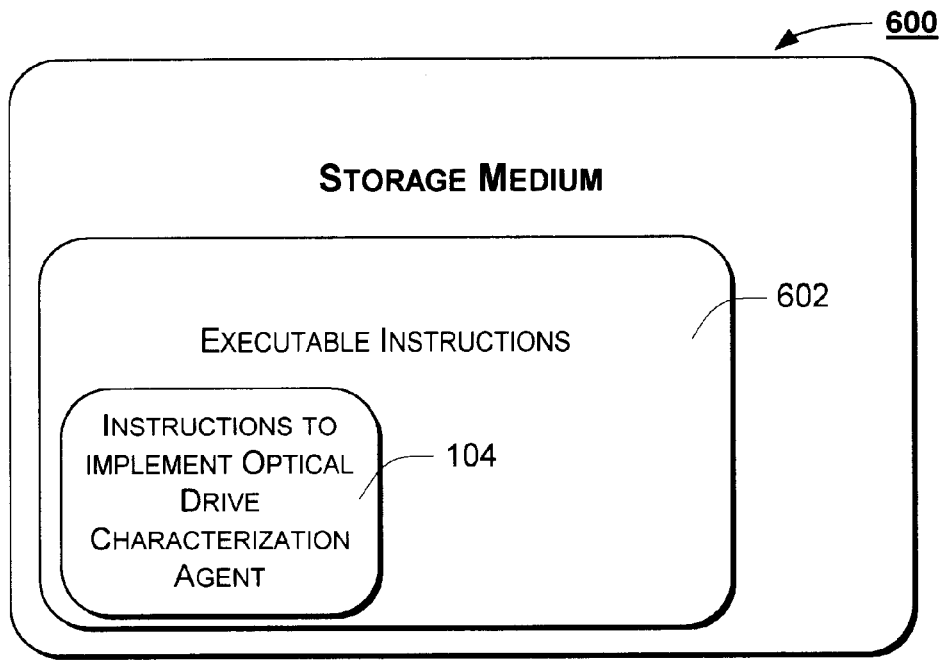
FIG. 6 is a block diagram of an example storage medium comprising a plurality of executable instructions that when executed implement the optical drive characterization agent of the present invention, according to one embodiment of the present invention.

FIG. 6 is a block diagram of a storage medium having stored thereon a plurality of instructions including instructions to implement the teachings of the present invention, according to yet another embodiment of the present invention. In general, FIG. 6 illustrates a storage medium/device 600 having stored thereon a plurality of executable instructions 602 including at least a subset of which that, when executed, implement the optical drive characterization agent 104 of the present invention. When executed by a processor of a host system, the executable instructions implementing characterization agent 104 iteratively control an optical drive to read at least two consecutive sectors of an audio file from an optical disk, analyze the read sectors from the audio file, and generate one or more optical drive read performance metrics based thereon. According to one implementation, characterization agent 104 selectively modifies one or more control settings in the optical drive to improve read performance based, at least in part, on the developed performance metrics.

As used herein, storage medium 600 is intended to represent any of a number of storage devices and/or storage media known to those skilled in the art such as, for example, volatile memory devices, non-volatile memory devices, magnetic storage media, optical storage media, and the like. Similarly, the executable instructions are in machine language, interpreted languages, and/or other source code that will be interpreted, such as, for example, C, C++, Visual Basic, Java, Smalltalk, Lisp, eXtensible Markup Language (XML), and the like. Moreover, it is to be appreciated that the storage medium/device 600 need not be co-located with any host system. That is, storage medium/device 600 may well reside within a remote server communicatively coupled to and accessible by an executing system. Accordingly, the software implementation of FIG. 6 is to be regarded as illustrative, as alternate storage media and software embodiments are anticipated within the spirit and scope of the present invention.

Although the invention has been described in language specific to structural features and/or methodological acts, it is to be understood that the invention defined in the appended claims is not necessarily limited to the specific features or steps described. Rather, the specific features and steps are disclosed as example forms of implementing the claimed invention.

What is claimed is:

1. A system comprising:
  an optical drive containing removably inserted optical media, the optical media including an audio file; and
  a characterization agent, implemented on a computer system communicatively coupled to the optical drive, to iteratively control the optical drive to perform incremental reads of at least a subset of the audio file, to analyze the read subset of the audio file, and to generate a score on one or more performance attributes of the optical drive based, at least in part, on the read subset of the audio file.

2. A system according to claim 1, wherein the optical drive is communicatively coupled to the computer system via a network.

3. A system according to claim 1, wherein the audio file is comprised of audio information which is known by the characterization agent prior to the analysis of the read subset of the audio file.

4. A system according to claim 3, wherein the audio file is comprised of a non-repeating audio pattern at least twice as large as a non-obvious offset for contiguous reads.

5. A system according to claim 4, wherein the audio pattern is a saw-tooth waveform with a period of 65,536 bundles.

6. A system according to claim 1, wherein the characterization agent reads at least two subsequent sectors of the audio file.

7. A system according to claim 6, wherein the characterization agent analyzes audio content within and between the two subsequent sectors.

8. A system according to claim 7, wherein the characterization agent analyzes each channel of audio content for each bundle of the sector to identify channel offsets.

9. A system according to claim 7, wherein the characterization agent analyzes subsequent bundles of audio content within a sector to identify alignment offsets.

10. A system according to claim 7, wherein the characterization agent analyzes a last bundle of one sector and a first bundle of a subsequent sector to identify inter-sector alignment offsets.

11. A system according to claim 7, wherein the characterization agent analyzes the audio content from the at least two subsequent sectors of the audio file to develop one or more metrics associated with the optical drive read performance.

12. A system according to claim 11, wherein the characterization agent modifies one or more control settings of the optical drive to improve read performance based, at least in part, on the one or more developed metrics.

13. A system according to claim 1, wherein the characterization agent modifies one or more control settings of the optical drive to improve read performance based, at least in part, on the generated score.

14. A system according to claim 1, further comprising:
  a storage device having stored therein a plurality of executable instructions including at least a subset of which that, when executed by the computer system, implement the characterization agent.

15. A system according to claim 1, wherein the audio file is taken from a commercially available audio disc comprising music, and wherein the characterization agent includes a separate digital representation of the audio file in a local memory prior to optical drive characterization.

16. A system according to claim 15, wherein the characterization agent iteratively controls the optical drive to read at least two consecutive sectors from the audio file.

17. A system according to claim 16, wherein the characterization agent compares data received from the optical drive to an associated at least two consecutive sectors from the separate digital representation of the audio file stored in local memory to develop one or more optical drive read performance attributes.

18. A system according to claim 17, wherein the characterization agent modifies one or more control settings in the optical drive based, at least in part, on the developed one or more optical drive read performance attributes.

19. A system according to claim 1, wherein the characterization agent is operationally coupled to a plurality of optical drives to develop one or more metrics of optical drive read performance for each of the plurality of optical drives.

20. A system according to claim 19, wherein the characterization agent selectively modifies control settings in at least a subset of the optical drives to improve optical drive read performance based, at least in part, on the developed metrics of optical drive read performance.

21. A system according to claim 20, wherein the modified control settings enable the optical drive to accurately read audio information on an individual sector basis.

22. A machine readable medium having stored thereon a plurality of executable instructions wherein at least a subset of which, when executed by a machine, implement an optical drive characterization agent to iteratively control one or more optical drive(s) to perform incremental reads of at least a subset of an audio file stored thereon, analyze the read subset of the audio file, and to generate one or more optical drive performance metrics based thereon.

23. A machine readable medium according to claim 22, wherein the incremental reads each retrieve one or more sectors of audio file content.

24. A machine readable medium according to claim 23, wherein the optical drive characterization agent analyzes the audio content within and between sectors to measure amplitude differences between bundles within and between sectors, and between channels within bundles.

25. A machine readable medium according to claim 24, wherein the characterization agent adjusts one or more settings associated with the optical drive based, at least in part, on one or more of the measured amplitude differences.

26. A machine readable medium having stored thereon a plurality of information which, when read by an optical drive, enable a computing system coupled to the optical drive to quantifiably measure one or more performance attributes of the optical drive including read accuracy, wherein the plurality of information is an audio file comprised of a non-repeating audio pattern at least twice as large as a non-obvious offset for contiguous reads from the audio file.

27. A machine readable medium according to claim 26, wherein the machine readable medium is optical media.

* * * * *